Figure 1:
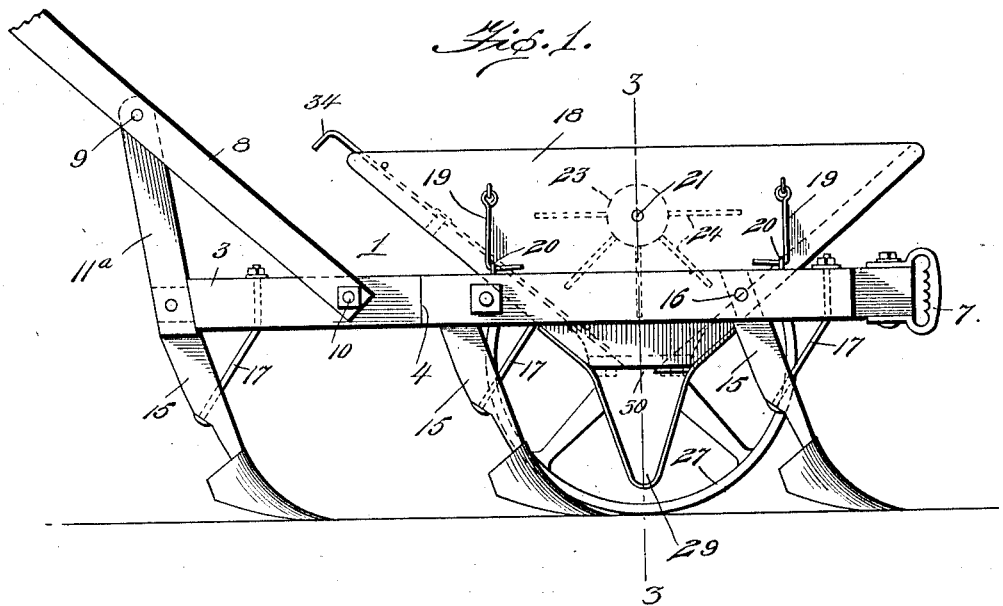

T. J. GRIMES.
COMBINED CULTIVATOR AND FERTILIZER DISTRIBUTER.
APPLICATION FILED JULY 6, 1911.

1,040,936.

Patented Oct. 8, 1912.

2 SHEETS—SHEET 1.

Witnesses

Inventor
T. J. Grimes

By
Attorney

T. J. GRIMES.
COMBINED CULTIVATOR AND FERTILIZER DISTRIBUTER.
APPLICATION FILED JULY 6, 1911.
1,040,936.
Patented Oct. 8, 1912.
2 SHEETS—SHEET 2.
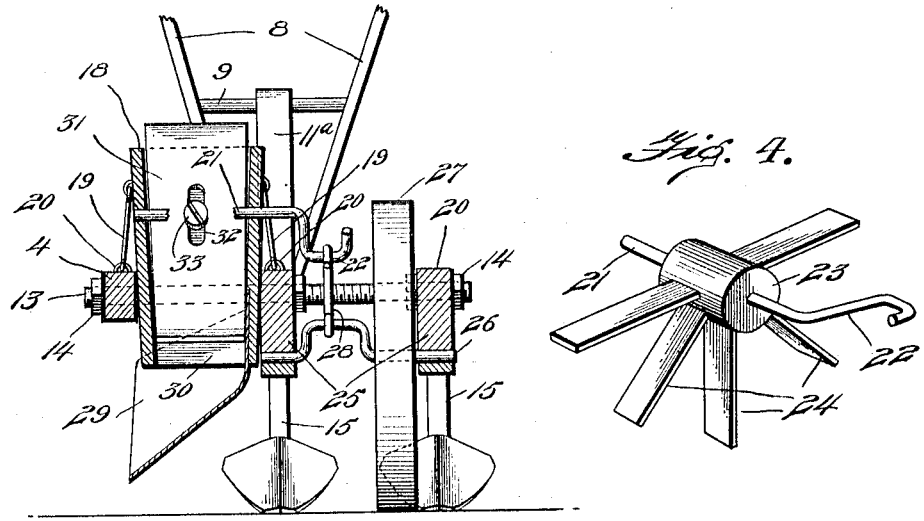

UNITED STATES PATENT OFFICE.

THOMAS J. GRIMES, OF YORK, ALABAMA.

COMBINED CULTIVATOR AND FERTILIZER-DISTRIBUTER.

1,040,936. Specification of Letters Patent. Patented Oct. 8, 1912.

Application filed July 6, 1911. Serial No. 637,136.

*To all whom it may concern:*

Be it known that I, THOMAS J. GRIMES, a citizen of the United States, residing at York, in the county of Sumter and State of Alabama, have invented certain new and useful Improvements in Combined Cultivators and Fertilizer-Distributers; and I do hereby declare the following to be a full, clear, and exact description of the invention, such as will enable others skilled in the art to which it appertains to make and use the same.

My invention relates to new and useful improvements in a combined cultivator and fertilizer distributer.

An object of my invention is to provide a device of this character which may be used as a fertilizer distributer and when it is desired the fertilizer hopper and mechanism attached thereto may be readily removed and the remaining parts of the device may be used as a cultivator.

A further object of my invention is to provide a combined cultivator and fertilizer distributer of a knock down construction which may easily be taken apart and stored away in a compact form in a barn or other suitable place in the season of the year when not in use or which may be readily assembled and perform all of the necessary requirements of such a device.

A still further object is to simplify devices of this character rendering them simple in construction, comparatively cheap in manufacture, durable and efficient in use and which may be readily operated.

Figure 2:
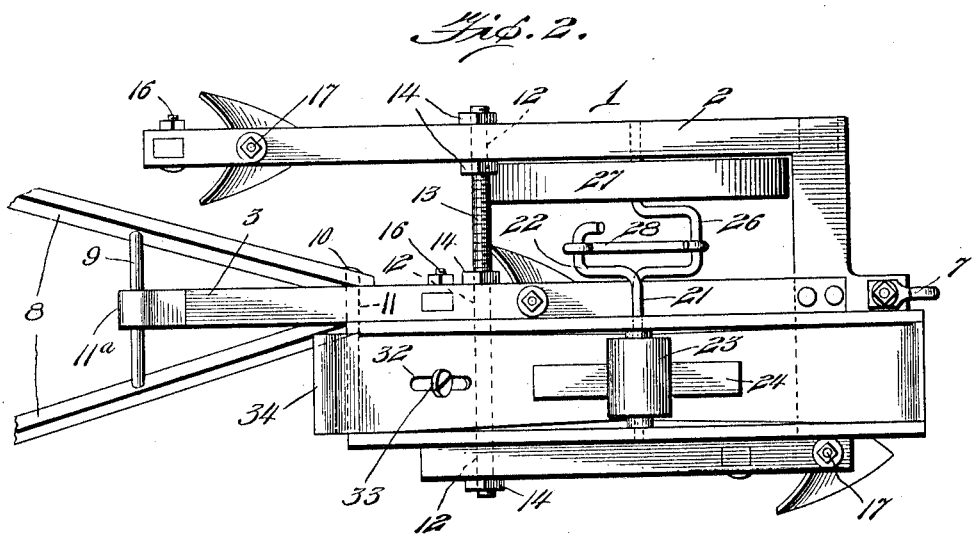

With these and other objects in view my invention consists of a novel construction, combination and arrangements of parts which will be fully described and more particularly pointed out in the drawing, in which:

Figure 1 is a side elevation of my improved fertilizer distributer and cultivator; Fig. 2 is a top plan view of the same; Fig. 3 is a vertical transverse section of the agitator on the plane indicated by the line 3—3 of Fig. 1; and Fig. 4, a view in perspective of the agitator.

Referring now to the drawing, the numeral 1 designates the frame of the device which consists of three parallel beams, two of which indicated by the numerals 2 and 3 are a little greater in length than the beam 4. The forward ends of the beams being connected by a transverse member 5 and attached to the same is a clevis 7 to which a suitable draft animal may be attached for drawing the same over the ground.

Secured to the central beam 2 and extending upwardly and rearwardly are suitable handles 8 by which the operator may guide the same. These handles are connected by a cross bar 9 and converged to their ends through which extends a bolt 10 which also extends through an aperture 11 of any ordinary construction for securing the said handle to the said beam. Mortised to the rear end of beam 2 is a member 11$^a$ through the opposite end of which extends cross bar 9 thereby forming a suitable support for the handles.

Extending through apertures 12 formed adjacent the rear end of the shorter beam 4 and the intermediate portion of the beams 2 and 3 is a threaded rod 13 having nuts 14 mounted thereon on each side of the beams thereby forming a suitable bracing member. Mortised to the forward end of the beam 4, the intermediate portion of the central beam 2 and the end of the beam 3 are plow stocks 15, having suitable plows secured to the ends thereof and the said stocks are secured to said beams by means of bolts as at 16 and are each braced by suitable bars 17.

From the foregoing I have described a cultivator, the parts of which may be taken apart or assembled or one or more of the plows may be used as desired. And to construct a fertilizer distributer I provide a hopper 18 which is mounted between the beams 2 and 4. The sides and ends of this hopper are tapered from top to bottom and when being placed between the beams 2 and 4 the sides will rest on said beams and the ends of said hopper will rest on the transverse member 5 and the rod 13 thereby forming a suitable support for the same. Mounted on each side of the hopper are hooks 19 which engage eyes 20 formed on the beams 2 and 4 which prevent any displacement of the hopper.

21 denotes an agitator shaft journaled in the sides of the hopper and provided on one side with a crank arm 22, a hub 23 is mounted on the said shaft and has extending radially therefrom agitator blades 24.

Formed on the lower sides of the beams 2 and 3 are bearings 25 having a crank shaft 26 mounted therein on which is mounted a ground wheel 27 for rotating the same. A link 28 connects the crank arm 22 of the agitator shaft and the crank shaft 26 whereby the rotatory motion of the shaft 26 will cause an oscillatory motion of the agitator shaft 21.

The bottom of the hopper is provided with a chute 29 which extends outwardly in position to discharge fertilizer from an opening 30 formed in the hopper beneath the plow as shown. A sliding valve 31 is mounted on the inner side of the hopper to regulate the flow of fertilizer through the opening 30. This sliding valve consists of a metal plate having an elongated slot 32 formed therein through which extends a lug 33 formed on the hopper and which acts as a keeper and guide for said metal plate the upper end of which is bent to form a handle 34 by which it may be operated.

Various changes in form, proportions and details of construction may be made within the scope of the invention without departing from the spirit or sacrificing any of the advantages thereof.

Having described my invention what I claim as desire to secure by Letters Patent, is:

In a fertilizer distributer comprising a frame consisting of three parallel beams, one being less in length, transverse members, one of which connecting one end of the beams and the other connecting the other end of the shorter beam and the intermediate portion of the other beams, a hopper, the sides and ends of which converge from top to bottom, the side and ends of said hopper resting on the shorter and one of the other beams and the two transverse members, eyes mounted on the beams, hooks mounted on the side of the hopper for engaging said eyes, a ground wheel mounted between the longer beams, an agitator mounted in said hopper and means connecting said agitator with said ground wheel substantially as described.

In testimony whereof I affix my signature in presence of two witnesses.

THOMAS J. GRIMES.

Witnesses:
R. H. HALE,
R. C. HILL.

---

Copies of this patent may be obtained for five cents each, by addressing the "Commissioner of Patents, Washington, D. C."